United States Patent

Blaas et al.

[11] Patent Number: 6,099,254
[45] Date of Patent: Aug. 8, 2000

[54] HELICOPTER ROTOR BLADE CONTROL DEVICE

[75] Inventors: Achim Blaas, Kassel; Michael Platzer, Ellenberg; Hans-Jürgen Götte, Vellmar, all of Germany

[73] Assignee: ZF Luftfahrttechnik GmbH, Calden, Germany

[21] Appl. No.: 09/214,222

[22] PCT Filed: Jul. 5, 1997

[86] PCT No.: PCT/EP97/03556

§ 371 Date: Dec. 30, 1998

§ 102(e) Date: Dec. 30, 1998

[87] PCT Pub. No.: WO98/02349

PCT Pub. Date: Jan. 22, 1998

[30] Foreign Application Priority Data

Jul. 11, 1996 [DE] Germany .......................... 196 27 869

[51] Int. Cl.[7] .................................................. B64C 27/605
[52] U.S. Cl. ..................... 416/114; 416/115; 416/134 A; 416/33
[58] Field of Search .................................... 416/114, 115, 416/31, 44, 48, 134 A, 140, 141, 500

[56] References Cited

U.S. PATENT DOCUMENTS

| 4,243,358 | 1/1981 | Carlock et al. | 416/114 |
| 4,930,988 | 6/1990 | Griffith | 416/114 |
| 5,310,315 | 5/1994 | LaFortune et al. | 416/114 |

FOREIGN PATENT DOCUMENTS

| 0 729 883 A1 | 9/1996 | European Pat. Off. |
| 2 607 465 | 6/1988 | France |
| 26 51 577 | 5/1977 | Germany |
| 27 36 409 | 2/1979 | Germany |
| 32 40 814 A1 | 5/1983 | Germany |
| 35 10957 A1 | 3/1986 | Germany |

OTHER PUBLICATIONS

The Royal Aeronautical Society, 16th European Rotorcraft Forum held Sep. 18–20, 1990 in Glascow, Scotland, "Design and First Tests of Individual Blade Control Actuators" by Peter Richter and Hans–Dieter Eisbrecher, Henschel Flugzeug–Werke, Kassel, Germany; Valentin Klöppel, MBB, Munich, Germany, 1990, vol. 2, 9 pp.

The Royal Aeronautical Society, 19th European Rotorcraft Forum held Sep. 14–16, 1993 in Cernobbio (Como), Italy, "Full Scale Wind Tunnel Investigation of an Individual Blade Control System for the BO 105 Hingeless Rotor" by Peter Richter, A. Blaas, Henschel Flugzeug–Weke, Kassel, Germany, 13 pp.

Friedman, Peretz P. and Thomas A. Millott, *Journal of Guidance, Control, and Dynamics* vol. 13, No. 4, Jul.–Aug. 1995, DC: Washington, pp. 664–672.

*Primary Examiner*—Edward K. Look
*Assistant Examiner*—Rhonda Barton
*Attorney, Agent, or Firm*—Davis and Bujold

[57] ABSTRACT

In a helicopter having three or more rotor blades, and with mechanical actuation of the rotor blades by a swash plate and a superimposed electrohydraulic active control system, in addition to three regulating units (18) is an actuator (4) between a rotatable part (9) of the swash plate and a rotorblade mount (2) of each rotor blade. This arrangement allows for the safe actuation of individual blades in helicopter noise reduction, and increased efficiency at a modest constructional effort.

4 Claims, 2 Drawing Sheets

HELICOPTER ROTOR BLADE CONTROL DEVICE

BACKGROUND OF THE INVENTION

The invention concerns a helicopter having the features stated in the preamble of claim 1.

The core part of a helicopter is the main rotor. One or more driving mechanisms actuate the main rotor via a transmission and a main rotor mast which is rotatably supported in the housing of the transmission and fastened on the head of the rotor.

The main rotor with its two and more rotor blades, which are hinged on a rotor head and rotatably supported around its longitudinal axis, takes care of not only the lift but also the propulsion. To produce lift, the rotor blades are collectively, that is, synchronously, engaged around an angle formed with the rotation plane. Propulsion is obtained by a cyclic control, that is, the angle of incidence of a rotor blade passes through a maximum and minimum during a revolution of the rotor mast. The position of the extreme values determines the direction of flight.

The helicopter pilot controls the rotor blades by a swash plate which comprises the main rotor mast. The swash plate consists of a stationary part by which so-called scissors are fastened on the housing of a transmission which is axially movable and tiltable in all directions relative to the rotor mast, and a rotatable part which is rotatably supported opposite the stationary part by radial and axial bearings. The rotatable part moves with the stationary part in the axial direction and likewise, makes the tilting movements. It is fastened on the rotor head by other scissors.

The motion of the swash plate is transmitted, via a lever mechanism, to rotor blade mounts on the rotor head, this is done mostly so that the angle of incidence of a rotor blade enlarges as the swash plate approximates the rotor head.

The helicopter pilot adjusts the swash plate for the flying maneuvers via one other lever mechanism. Often situated parallel to the latter are hydraulic servomotors which, on one hand, facilitate the control and, on the other, make possible a superimposed regulation which counteracts the oscillations of the rotor blade that appear.

The highest useable speed of helicopters is limited by rotor-induced oscillations and by the efficiency of the forward flying main rotor. Oscillations and inefficiencies result from non-optimal angles of incidence of the rotor blades relative to the momentary direction and speed of the oncoming flow and from their dynamic characteristic. To counteract said effects, it is advantageous to flexibly control the angle of incidence of the blade. Whirling resulting from abrupt flow on the rotor blades can be controlled, for example, by failure suppressant regulators with the aid of band filters for the first natural torsion frequency of the rotor blades. Thereby noise and vibrations are reduced and the efficiency, the same as the economy, are improved. In addition, the work load of the pilot is diminished.

Two active control systems are basically known (Paper— No. II, 6.3.1., Sixteenth European Rotokraft Forum, Sep. 18–21, 1990, Glasgow "Development and First Tests of Actuators for an Individual Blade Control" Peter Richter, Hans-Dieter Eisbrecher, Valentin Kloppel), namely, the high harmonic control which is superimposed to the control of the swash plate and the actuators of which are situated below the swash plate in the helicopter stationary system, and the individual blade control in which with each rotor blade is associated an actuator in the rotary system between the rotatable part of the swash plate and the rotor blade mounts.

In the high harmonic control, due to the actuators in the helicopter stationary system, high frequency blade angle changes are transmitted, via the swash plate, to the rotor blades. For reasons of geometry only, certain frequencies can thus be transmitted, namely, the so-called blade number harmonic and the immediately adjacent frequencies in a four-blade rotor, therefore, the fourth, third and fifth, the eighth, seventh and ninth, etc. harmonics of the rotor rotary frequency but not the second, sixth or tenth harmonics. The corresponding applies to rotors having more than four blades.

In the individual blade control, there are no limitations relative to the frequencies and signal form, but the constructional effort for the actuators in the rotary system are considerably high due to the additional centrifugal force strains and the energy and signal transmission from the helicopter stationary system to the rotary system. Besides, the fact that each actuator can be individually controlled entails the danger that the rotor blades, in case of failure of operation of the regulation system may move randomly which impairs safety.

The problem on which the invention is based is to provide in a helicopter of the above mentioned type an individual control of the rotor blades that is light weight, of minimal contructional effort, and has good efficiency.

SUMMARY OF THE INVENTION

In the helicopter, according to the invention, in a high harmonic rotor blade control, additional actuators are situated in the rotary system between the swash plate and the rotor blade mounts, but only for the rotor blade mounts which exceed the number of three. Thus, the frequencies and signal forms not controllable by the high harmonic control are detected. At the same time, the contruction effort is kept low, since only relatively few actuators are additionally needed. With the small number of actuators the weight is also reduced accordingly.

The control is further simplified, since only a fragment of the setting energy and of the control signals have to be transmitted from the helicopter stationary system to the rotary system. Should the control of the individual blades brake down or fail due to the additional hydraulic actuators, it can be stopped or bridged without endangering the safety of the helicopter, since the conventional control system is sufficient for flying with limited comfort and efficiency.

Safety can still further be increased when the authority of the individual blade control is limited, that is, its control portion makes only a limited part of the whole control range, being, for example, less than 8 degrees.

BRIEF DESCRIPTION OF THE DRAWING (S)

One embodiment of the invention is shown in the drawing wherein.

DESCRIPTION OF THE PREFERRED EMBODIMENT(S)

Figure 1:
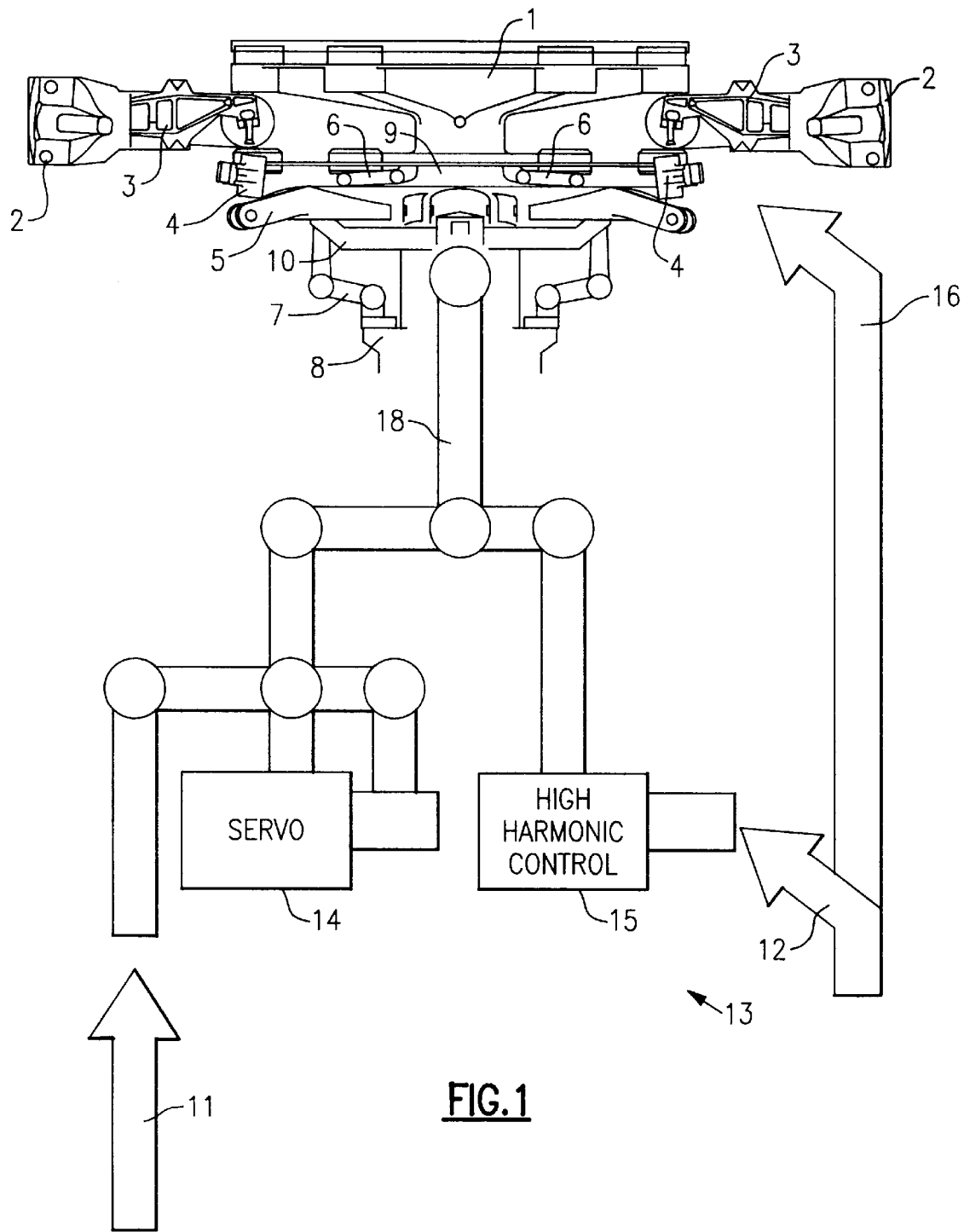
FIG. 1 shows a partial view of a helicopter input.

FIG. 1 shows a rotor head 1 of a main rotor of a helicopter on which rotor blades, not shown in further detail, are each hinged via a rotor blade mount 2. The mount has a control lever 3 with which it can be adjusted together with the rotor blade around the longitudinal axis thereof.

The helicopter shown has six rotor mounts 2 of which two are plotted diametrically opposite. They belong to a total of three which can be individually controlled, for example, by hydraulic actuators 4, while the remaining three are controlled only by a swash plate having a rotatable part 9 and a stationary part 10.

The control lever 3 engages, via a joint, the hydraulic actuator 4 or a guide rod, not shown. By their free ends, the hydraulic actuators are hinged on brackets 5 of the rotatable part 9 of the swash plate. The rotatable part 9 is supported opposite the stationary part 10 of the swash plate by axial and radial bearings 19. Gaskets outwardly seal the area of the axial and radial bearings.

Figure 2:
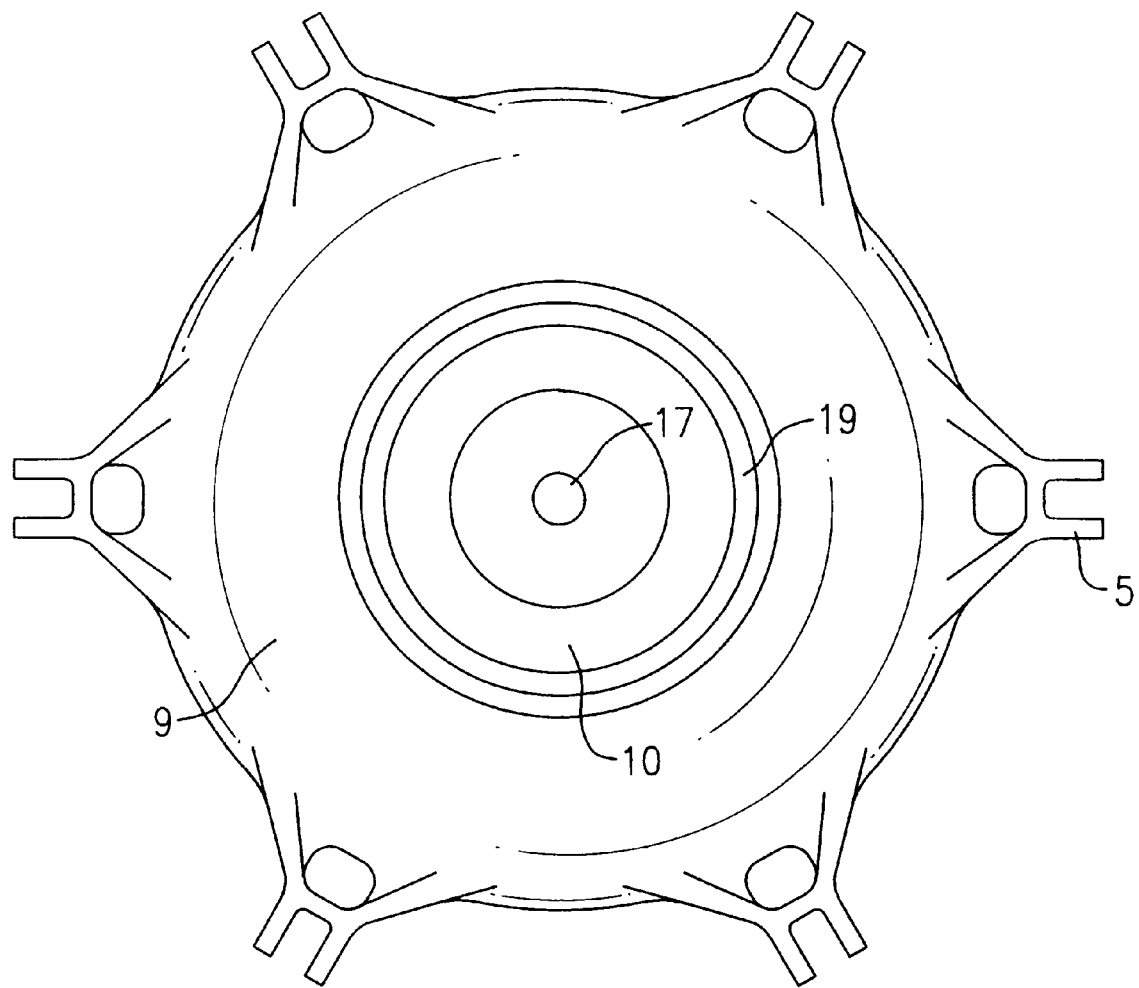
FIG. 2 shows a rotatable part of a swash plate.

One or more so-called scissors 7 hold fast the stationary part 10 of the swash plate on a housing 8 of a transmission but allow the swash plate to move axially and be tiltable in all directions relative to the main rotor mast 17 (FIG. 2). The rotatable part 9, via other scissors 6, is taken along for rotation by the rotor head 1.

If the swash plate is axially moved, the movement is converted by the bracket 5, the hydraulic actuator 4, and the control lever 3 to a blade angular adjustment and all thus, rotor blades are collectively adjusted in their angle of incidence. If on the contrary the swash plate is tilted, the angle of incidence of one of each rotor blade passes through a maximum and a minimum during a revolution of the rotor. This is called a cyclic control which determines the direction of flight and the speed of flight.

Three regulating units or actuators 18 distributed over the periphery adjust the swash plate. They are controlled by a helicopter control 13 with an input 11 by which a pilot adjusts the swash plate. Superimposed on the input is a servo device 14 which assists the pilot's manual force. Further provided is a high harmonic control 15. The control receives signals from a computer via an electronic input 12 according to the high-frequency oscillations of which there are produced the so-called blade number harmonics which, via the swash plate, counteract the rotor-induced oscillations.

The rotor-induced oscillations, not detected by the high harmonic control 15, are combated by the additional actuators 4 in the rotary system which are controlled, via a signal line 16, for an individual blade control. Thus, all frequencies and signal forms in question can be controlled with little effort.

In a main rotor, having four rotor blades, there are three actuators 18 in the helicopter stationary system and an additional hydraulic actuator 4 in the rotary system.

Between the input control variables (collective control angles, sine or longitudinal control angles, cosine or lateral control angles and individual control angles) and the angle of incidence of the rotor blades, the following relationships result here:

| | |
|---|---|
| $\omega t$ | rotor revolution angle |
| $\theta\_o$ | collective control angle |
| $\theta\_s$ | sine control angle |
| $\theta\_c$ | cosine control angle |
| $\theta\_ibc$ | individual control angle |
| $\theta 1$ | angle of incidence for the rotor blade 1 |
| $\theta 2$ | angle of incidence for the rotor blade 2 |
| $\theta 3$ | angle of incidence for the rotor blade 3 |
| $\theta 4$ | angle of incidence for the rotor blade 4 |
| $\theta 1 =$ | $\theta\_o + \theta\_s \sin(\omega t) + \theta\_c \cdot \cos(\omega t)$ |
| $\theta 2 =$ | $\theta\_o + \theta\_s \sin(\omega t - \pi/2) + \theta\_c \cdot \cos(\omega t - \pi/2)$ |
| $\theta 3 =$ | $\theta\_o + \theta\_s \sin(\omega t - \pi) + \theta\_c \cdot \cos(\omega t - \pi)$ |
| $\theta 4 =$ | $\theta\_o + \theta\_s \sin(\omega t - 3\pi/2) +$ $\theta\_c \cdot \cos(\omega t - 3\pi/2) + \theta\_ibc$ |

The equations can also be solved according to the control angles so that for each combination of angles of incidence of the rotor blades, the required control angles result. The principle is also applicable to main rotors having more than four blades.

| Reference numerals | |
|---|---|
| 1 rotor head | 10 stationary part |
| 2 rotor blade mount | 11 input or control input |
| 3 control lever | 12 electronic input |
| 4 actuator in the rotary system | 13 helicopter control |
| 5 bracket | 14 servo device |
| 6 scissors | 15 high harmonic control |
| 7 scissors | 16 signal line |
| 8 housing | 17 main rotor mast |
| 9 rotatable part | 18 regulating unit |

What is claimed is:

1. A helicopter comprising:

a rotor head (1) fastened on a main rotor mast (17) which is pivotally supported in a housing (8) of a transmission;

at least one driving mechanism for driving said main rotor mast (17) via the transmission;

a swash plate of said main mast (17) having both a stationary part (10), non-rotatably supported but axially movable and tiltable in all directions relative the axis of said main rotor mast (17) by said housing, via first scissors (7) therebetween; and a rotatable part (9), rotatably supported opposite said stationary part (10) by axial and radial bearings (19) and non-rotatably hinged on said rotor head (1) by means of second scissors (6);

said rotor head (1) carries on its periphery at least three rotor blade mounts (2), which are adjustable around the longitudinal axis of said rotor blades by means of control levers (3) which are flexibly connected with said rotatable part (9) of said swash plate; and said swash plate is operated by three regulating units distributed over the periphery which are controlled by a helicopter control (13) with one input (11) and one electronic input (12), wherein between said rotatable part (9) of said swash plate and the rotor blade mounts (2), are electronically controlled actuators (4).

2. The helicopter according to claim 1, wherein said actuators (4) are distributed over the periphery as evenly as possible.

3. The helicopter according to claim 2, wherein actuators (4) produce a minimum range of angle of incidence of less than 8 degrees.

4. The helicopter according to claims 2, wherein said actuators (4) are hydraulic actuators.

* * * * *